Patented June 4, 1946

2,401,525

UNITED STATES PATENT OFFICE 2,401,525

METHOD OF INTRODUCING AN AMINO GROUP INTO AROMATIC COMPOUNDS

Jozef Szczesny Turski, London, England

No Drawing. Application February 8, 1944, Serial No. 521,579. In Great Britain February 9, 1943

10 Claims. (Cl. 260—518)

Aromatic amino compounds are normally made by the reduction of nitro compounds or by substitution of a halogen or other radicle in the aromatic compound by reaction with ammonia.

German Patent No. 287,756 describes the introduction of an amino group into an aromatic compound by heating the latter with hydroxylamine and concentrated sulphuric acid, preferably in the presence of a metallic salt as catalyst. The catalysts employed were generally iron compounds employed partly in solution and partly in suspension. The presence of a catalyst in suspension however often introduced over strong local reactions, which resulted in the formation of undesirable tarry products.

The present invention provides a method of introducing an amino group into an aromatic compound, which comprises reacting the aromatic compound, in the presence of strong sulphuric acid and a dissolved metallic salt, with a compound containing the group $—CH_2.NO_2$.

When a compound of formula $R—CH_2.NO_2$, in which R represents a hydrogen atom, or an alkyl, aryl or aralkyl group, some at least of the hydrogen atoms in which may be substituted, is treated with strong sulphuric acid, the following preliminary reaction is believed to take place:

$$R—CH_2.NO_2 + H_2SO_4 \rightarrow OH.NH.SO_2OH + R.COOH$$

and the product $OH.NH.SO_2OH$ is then believed to react with any aromatic compound present in the solution to introduce an amino group into the aromatic ring.

Thus, where $R^1ar.$ represents the residue of an aromatic compound obtained by subtracting from an aromatic ring a hydrogen atom to be replaced by an amino group, the overall reaction may be represented as follows:

$$R—CH_2.NO_2 + R^1ar.H \rightarrow R^1ar.NH_2 + R.COOH$$

Where nitroparaffins are reacted with the aromatic compound the following are examples of typical reactions:

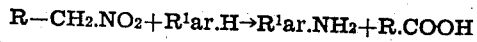
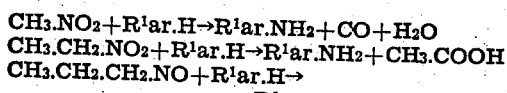
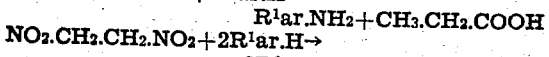
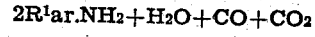

It will be observed that in each case the nitromethane group $—CH_2.NO_2$ is converted into a carboxylic group, and an amino group is introduced into the aromatic compound in place of a hydrogen atom. In the first example, where nitromethane is used, the resulting formic acid $H.COOH$ decomposes however into carbon monoxide and water. In the last example the oxalic acid formed decomposes into carbon monoxide, carbon dioxide and water.

While reference has been made to a preliminary reaction, resulting in the formation of the intermediate product $OHNOSO_2OH$, it is to be understood that this is purely theoretical and is put forward as affording a probable explanation of what occurs. There is no observable separation of the overall reaction into separate stages, and in practice it proceeds smoothly to finality apparently in a single stage. Care must, however, be exercised to avoid overheating, owing to the exothermic nature of the reaction.

The process of introducing the amino group resembles the reaction with hydroxylamine or hydroxylaminesulphonic acid. Aromatic compounds which are soluble in sulphuric acid bind the amino group directly on being heated. On the other hand, aromatic compounds, e. g. benzene, naphthalene and the like, which are easily sulphonated or insoluble in sulphuric acid, are firstly sulphonated and at the same time dissolved in sulphuric acid and only then do they combine with the amino group. In this case the product is an aminosulphonic acid.

To obtain a good yield it is necessary to employ, as a catalyst, a metallic salt, e. g. a salt of iron or vanadium, dissolved in the solution. It has been found that a vanadium salt is a better catalyst than an iron salt. The more concentrated the sulphuric acid the more rapid is the reaction; but on the other hand the sulphuric acid must be sufficiently dilute to dissolve the catalyst, to avoid the above-described disadvantage of a catalyst employed in suspension. Catalysts which are soluble in highly concentrated sulphuric acid are therefore preferred.

Thus ferrous sulphate dissolves in 98% sulphuric acid to the extent of about 0.25 gm. in 100 gms. acid. Vanadyl sulphate however dissolves in 98% sulphuric acid to the extent of about 0.5 gm. in 100 gms. acid and therefore acts more energetically. Ammonium vanadate must be used with care, as when heated it oxidises slightly the hydroxylamine derivative produced by the abovementioned preliminary reaction. On the other hand, being very easily soluble in concentrated sulphuric acid, less soluble compounds are formed by reduction and thus precipitated. Yet the above-mentioned products are easily soluble in more dilute sulphuric acid, e. g. in 100 gms. of an 82% acid 1 gm. of ferrous sulphate is soluble, and vanadyl sulphate or ammonium vanadate are even more soluble. By a right selection of these catalysts dissolved in 98%, 82% as well as 78% acid, the best concentration of acid and of the dissolved catalyst can be obtained.

The speed of the reaction is greatly influenced by the amount of catalyst. Thus using 0.025% of a catalyst 66% of the theoretical yield of aminoanthraquinone was obtained, but using 0.125% vanadyl sulphate the yield of aminoanthraquinone was 80%; both experiments were made under the same conditions concerning time and other reagents. The amount and concentration of sulphuric acid are also of importance. Upon the amount of sulphuric acid used depends the checking of the secondary decomposition reactions and a clean course of the reaction. Too small an amount of acid results in reduction of the acid by hydroxylamine compounds and by organic compounds formed as a result of the reaction. The amount of sulphuric acid used is usually ten times that of the aromatic compound. Somewhat diluted acids, e. g. 82% or 90% are used in a slightly greater amount than the 98%. The reaction in such diluted acids is much calmer and the obtained product is much purer.

The organic acids formed in the course of the reaction, e. g. acetic or propionic acid, can be gradually distilled off during the process.

Where the R—CH$_2$NO$_2$ is an aromatic compound, the OH.NH.SO$_2$OH and R.COOH presumed to be formed by the preliminary reaction appear to react to effect introduction of an amino group into the aromatic nucleus R; the overall reaction being represented by:

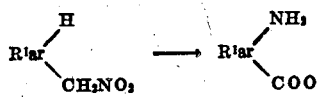

Thus, in the specific case of phenyl nitromethane:

The carboxylic group —COOH in these cases remains in the final product and can later be dehydrated and decomposed. This reaction needs a much longer heating, 10 hours or more, for obtaining a good yield.

The above-mentioned reaction

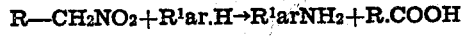

will proceed, where R is an aryl or an aralkyl group, only in those cases where the intermediate compound OH.NH.SO$_2$OH acts preferentially on the aromatic nucleus R$^1$ar. Otherwise the compound R$^1$arH will remain unchanged, and the amino group will be introduced into the nucleus R.

The reaction according to the invention is of particular utility for the purpose of introducing an amino group into aromatic compounds, dyestuffs, e. g. of the anthraquinone group, or indigoids, and when the reduction of the nitro group is difficult of performance. It is also useful for analytical purposes, where the presence of a benzene or naphthalene ring is suspected. The resulting amino compound, formed by the above-described reaction, is readily detectable by diazotization and so affords a convenient means of detecting the presence or otherwise of the suspected aromatic ring.

The invention includes aromatic compounds having an amino group substituted in the nucleus when made by the process according to the invention.

The following are examples of how the invention can be carried into effect:

*Example I*

One part by weight of benzene was dissolved, being at the same time sulphonated, in four parts by weight of 98% sulphuric acid containing iron or vanadium salts. After the sulphonation is accomplished four parts of 82% sulphuric acid containing vanadium or iron salts were added. Eight parts of 90% acid were thus obtained containing 1.5–1.8 gms. vanadyl or iron sulphate per 200 gms. of acid. To this solution at a temperature of 142–145° C. was added in small quantities 0.85 part by weight of nitromethane or dinitroethane or 1 part by weight of nitroethane or 1.2 parts by weight of nitropropane, dissolved in two parts of 90% sulphuric acid containing vanadium or iron salts. When all the amount had been added and the nitroparaffins had gradually come into reaction, the mixture was heated for about 12 hours at 160–165° C. and then for about 12 hours at 180–185° C. After the reaction was finished the whole mixture was poured into a 2.5-fold amount by weight of cold water and left for one day. Sulphanilic acid crystallised out. The filtrate was neutralized with chalk to a slightly acid reaction on Congo paper. The resulting calcium sulphate was filtered and twice washed with hot water. After evaporating, firstly sulphanilic acid, secondly the benzenesulphonic acid which escaped reaction (in an amount of 25–35% of the theory) and lastly metanilic acid crystallised out, each of them was separately filtered. 1.5 parts by weight of crystallised sulphanilic acid and 0.2 part by weight of crystallised metanilic acid were thus obtained. When the temperature at the end of the process is raised, the amount of sulphanilic acid increases.

In the same way aminonaphthalenesulphonic acid was obtained from pure naphthalene.

*Example II*

12 parts by weight of phthalic anhydride were dissolved in 80 parts by weight of 90–92% sulphuric acid containing 0.6 part by weight of vanadyl sulphate or iron sulphate. Keeping the temperature at 143–145° C., 5 parts by weight of dinitroethane or nitromethane or 6.2 parts by weight of nitroethane or 7.5 parts by weight of nitropropane, each as a solution in sulphuric acid, were gradually added. After the exothermic reaction had ceased the temperature was gradually raised to 175° C. The heating was carried on for 15 hours. The obtained product was poured into a 10-fold amount of water and left during the night for crystallisation. Then the residual phthalic acid was separated by filtration, the filtrate was neutralised with chalk to a slightly acid reaction on Congo paper and filtered, the remaining calcium sulphate being twice washed. All the filtrate was evaporated to 200–150 parts; the crystallised phthalic acid was separated by filtration, and the filtrate was evaporated to 60–50 parts; 13 parts of aminophthalic acid was crystallised out. From the remaining filtrate the rest of the aminophthalic acid was crystallised.

In the same way amino-sulpho-benzoic acid was obtained from benzoic acid.

*Example III*

(a) 8 parts by weight of anthraquinone was dissolved in 100 parts by weight of 90% sulphuric acid containing vanadyl or iron sulphate in an amount of about 0.75 part by weight. The whole was heated to effect the solution and then, at a temperature of 140–145° C., 3.5 parts by weight of nitroethane or 2.6 parts by weight of nitromethane or dinitroethane, dissolved in 20 parts of 90% sulphuric acid containing about 0.07 part of vanadyl or iron sulphate were gradually added. After the exothermic reaction ceased the mixture was heated for 4 hours at 162° C., 4 hours at 175° C., and 4 hours at 182° C.

(b) To 50 parts of 94% sulphuric acid a solution of 3.15 parts of dinitroethane in 25 parts of 94% sulphuric acid was added, the temperature being kept at 140–150° C. After the reaction had ceased the mixture was cooled to 100° C. and then 10.4 parts of anthraquinone and a solution of 0.2 part of vanadyl sulphate in 50 parts of 94% sulphuric acid were added. The following reaction being still exothermic, the heating from the temperature of 130° C. upwards has to be carried on very carefully to avoid overheating above 160° C. Then the mixture was heated at 160° C. for 15 hours and at 165° C. for 6 hours.

(c) As (b), but 0.6 part of vanadyl sulphate instead of 0.2 part was used.

(d) As (a), but 94% sulphuric acid instead of 90%, and 0.6 part of vanadyl sulphate instead of 0.75 part were used.

In all cases, (a), (b), (c) and (d), after the reaction was finished and the mixture had cooled it was diluted so as to make the sulphuric acid 76–77%, then an equal amount of 76% sulphuric acid was added, the mixture was heated till everything was clearly dissolved, and after cooling it to 20° C. the precipitated unchanged anthraquinone was filtered off.

In cases (a) and (d) 22% unchanged anthraquinone was obtained;

In case (b) 27.7% unchanged anthraquinone was obtained;

In case (c) 27.1% unchanged anthraquinone was obtained.

The filtrate was diluted with water and the amino-anthraquinone was separated by filtration.

If a double or triple amount of nitro- or dinitroparaffins is used, unchanged anthraquinone is not obtained, and a mixture of mono-, di-, and poly-aminoanthraquinones is formed.

In the same way aminoanthraquinonesulphonic acids were obtained from anthraquinonesulphonic acid, aminochloroanthraquinone from chloroanthraquinone, and aminophenanthrenequinone from phenanthrenequinone.

*Example IV*

10 parts by weight of benzanthrone was dissolved in 120 parts by weight of 80–82% sulphuric acid containing about 1 part vanadyl or iron sulphate in 100 parts acid, and it was then heated to 140–150° C. adding at the same time in small portions 3.1 parts by weight of nitromethane or dinitroethane, or 3.75 parts by weight of nitroethane, or 4.5 parts by weight of nitropropane, and the mixture was then heated for 10 hours at 160–175° C. The product was diluted so as to obtain a 50% sulphuric acid and a mixture of aminobenzanthrone sulphate with free aminobenzanthrone was precipitated and filtered off. These compounds were separated using benzene or alcohol. The aminobenzanthrone sulphate so obtained was diluted with water, filtered and dried. Aminobenzanthrone purified by dissolving in 55% sulphuric acid yields by melting with KOH a very fast black cotton dyestuff, which on reduction forms a violet coloured vat.

In the same way an amino group can be introduced into phenanthrenequinone, yielding aminophenanthrenequinone.

*Example V*

4.6 parts by weight of dibenzanthrone were dissolved in 50 parts by weight of 98% sulphuric acid containing 0.25 part by weight of vanadyl sulphate or an equivalent amount of ammonium vanadate. At a temperature of 140–145° C. was added a solution of 0.65 part by weight of nitromethane or crystallised dinitroethane, or 0.8 part by weight of nitroethane, each in 10 parts by weight of sulphuric acid. When all the nitroparaffin had been added the mixture was heated for 12–15 hours at a temperature of 165–175° C. The obtained product was poured into a 20-fold amount of cold water, filtered and carefully washed out from the acid. A black dyestuff was obtained dyeing cotton from a violet vat.

By further aminification a black dyestuff with a greenish shade was obtained.

In a similar way by introducing an amino group into isodibenzanthrone (isoviolanthrone) a dark navy-blue dyestuff with a blue vat was obtained, and by further aminification the shade becomes darker. Pyranthrone yields brown dyestuffs dyeing from a red vat. From indigo and thioindigo grey dyestuffs are obtained.

*Example VI*

1 part by weight of phenylnitromethane was dissolved in 10 parts by weight of 90% sulphuric acid containing 0.5 gm. vanadyl sulphate in 100 gms. sulphuric acid, and then heated for three hours at about 160° C. Aminobenzoic acid was obtained, and this was precipitated by salt from a tenfold water solution.

What I claim as my invention and desire to secure by Letters Patent is:

1. A method of substituting, in an aromatic compound including a homocyclic ring containing a hydrogen atom attached to one of the carbon atoms of the ring, an amino group for said hydrogen atom, which comprises heating said aromatic compound in strong sulphuric acid with a paraffin containing at least one nitro group, the solution containing a dissolved salt of a metal of the group consisting of iron and vanadium.

2. A method of substituting, in an aromatic compound including a homocyclic ring containing a hydrogen atom attached to one of the carbon atoms of the ring, and a side chain including a —CH2NO2 group attached to another carbon atom of the ring, an amino group for said hydrogen atom, which comprises heating said aromatic compound in strong sulphuric acid containing in solution a salt of a metal of the group consisting of iron and vanadium.

3. A method of substituting, in an aromatic compound including a homocyclic ring containing a hydrogen atom attached to one of the carbon atoms of the ring, an amino group for said hydrogen atom, which comprises dissolving said aromatic compound in strong sulphuric acid containing in solution a salt of a metal of the group consisting of iron and vanadium, admixing said solution with a solution in strong sulphuric acid of a nitro paraffin, heating the mixture and separating the amino compound produced by the reaction.

4. A method of substituting in an aromatic compound including a homocyclic ring containing a hydrogen atom attached to one of the carbon atoms of the ring, an amino group for said hydrogen atom, which comprises reacting said aromatic compound, in solution in strong sulphuric acid and in the presence of a catalyst, constituted by a salt of a metal of the group consisting of iron and vanadium, with a compound of formula $R$—$CH_2.NO_2$ where R is a radicle selected from the group consisting of hydrogen, alkyl, aryl and aralkyl.

5. A method as claimed in claim 4, in which the catalyst is wholly dissolved in the sulphuric acid.

6. A method of substituting in an aromatic compound including a homocyclic ring containing a hydrogen atom attached to one of the carbon atoms of the ring, an amino group for said hydrogen atom, which comprises treating said aromatic compound with a nitroparaffin in the presence of strong sulphuric acid and a catalyst, said catalyst being constituted by a salt of a metal of the group consisting of iron and vanadium and being wholly dissolved in the sulphuric acid.

7. The process which consists in reacting an aromatic compound of formula $R^1arH$ with a compound of formula $R.CH_2.NO_2$ in the presence of strong sulphuric acid and a catalyst constituted by a salt of a metal of the group consisting of iron and vanadium, to produce a compound of formula $R^1arNH_2$, where $R^1ar$ represents the residue obtained by subtracting a hydrogen atom from a homocyclic ring in an aromatic compound and R is a radicle selected from the group consisting of hydrogen, alkyl, aryl and aralkyl.

8. The process claimed in claim 7, in which the catalyst is wholly dissolved in the sulphuric acid.

9. The process which consists in reacting, in the presence of strong sulphuric acid, an aromatic compound of formula

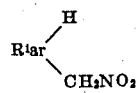

$R^1ar$ representing the residue obtained by subtracting a hydrogen atom from a homocyclic ring in the aromatic compound, with a catalyst constituted by a salt of a metal of the group consisting of iron and vanadium, to produce a compound of formula

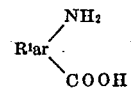

10. A method of manufacturing aminobenzoic acid, which comprises heating phenyl-nitromethane in sulphuric acid containing in solution a vanadium salt.

JOZEF SZCZESNY TURSKI.